United States Patent [19]

Theodoulou et al.

[11] Patent Number: 4,951,070

[45] Date of Patent: Aug. 21, 1990

[54] CHARGE TRANSFER IMAGING CARTRIDGE MOUNTING AND PRINTER

[75] Inventors: Sotos M. Theodoulou, Bramalea; Andrzej Maczuszenko, Stoufville; Sabir H. Bajwa, Mississauga; Duncan J. Gibbons, Kitchener; Wojciech Zalewski, Mississauga, all of Canada

[73] Assignee: 501 Delphax Systems, Mississauga, Canada

[21] Appl. No.: 428,025

[22] Filed: Oct. 26, 1989

Related U.S. Application Data

[63] Continuation of Ser. No. 171,729, Mar. 22, 1988, abandoned.

[51] Int. Cl.$^5$ .............................................. G01D 15/00

[52] U.S. Cl. ................................. 346/155; 346/139 C

[58] Field of Search ................... 346/155, 139 C, 150, 346/153.1, 154; 400/119

[56] References Cited

U.S. PATENT DOCUMENTS

| | | | |
|---|---|---|---|
| 4,155,093 | 5/1979 | Fotland et al. | 346/153.1 |
| 4,160,257 | 7/1979 | Carrish | 346/153.1 |
| 4,257,054 | 3/1981 | Ishiyawa | 346/155 |
| 4,261,631 | 4/1981 | Guilcher et al. | 346/153.1 |
| 4,516,847 | 5/1985 | Maczuszenko et al. | 346/153.1 |
| 4,679,060 | 7/1987 | McCallum et al. | 346/153.1 |

*Primary Examiner*—Donald A. Griffin

*Attorney, Agent, or Firm*—Rogers & Scott

[57] ABSTRACT

There is described a cartridge mounting for locating a cartridge in a printer adjacent a print drum for receiving a charge image from the cartridge. The cartridge includes a spine and has a longitudinal axis substantially parallel to the axis of rotation of the print drum and an inner face adjacent the image receiving portion of the drum surface. The mounting has provision for locating the cartridge radially in relation to the axis of rotation of the drum and for biasing the cartridge towards the drum surface. Further provision is made for locating the cartridge tangentially in opposition to the direction of travel of the drum surface. Spacers extend from the inner face of the cartridge to abut the drum surface at a sliding contact, thus spacing the cartridge a predetermined distance from the surface.

10 Claims, 5 Drawing Sheets

CHARGE TRANSFER IMAGING CARTRIDGE MOUNTING AND PRINTER

This application is a Continuation of application Ser. No. 07/171,729 filed Mar. 22, 1988 and now abandoned.

BACKGROUND OF INVENTION

This invention relates to charge transfer imaging and more particularly to a cartridge mounting for locating a cartridge for creating a latent image in a printer adjacent a dielectric surface for receiving the image. The invention has particular application in the location of a cartridge in a printer adjacent a dielectric coated print drum for receiving an image from the cartridge.

The present invention is described herein with reference to an exemplary printer which utilizes a print drum. It will be clear to those skilled in the art that the present invention may also be used in combination with printers utilizing different configurations of image receiving surfaces.

There is an increasing need for peripheral which can accept a computer or word processor output and convert the output to an image on paper, commonly called a "hard copy". Typically such a peripheral is a printer which uses a charge transfer process similar to that described in U.S. Pat. Nos. 4,155,093 to Fotland and Carrish, or 4,160,257 to Carrish, which utilizes a combination of electrodes which can be controlled to place a charge on a drum coated for instance with alumumium oxide impregnated with a wax. In this way latent images are built up corresponding to the image to be produced on the paper and this image is then toned and transferred to the paper and fused. Should it be necessary to produce a second copy, the procedure is repeated to give as many copies as necessary. Further, it is possible to vary the image by electronic control so that parts of the image can be printed, or the complete image can be turned through 90° with respect to the paper. These possible variations make such printers desirable equipment where hard copies of information are required.

The print cartridge is located adjacent the print drum surface and normally extends substantially parallel to the axis of rotation of the drum. The inner surface of the cartridge, which faces the drum surface and includes the source of the charges, must be accurately spaced from the drum such that it is close enough to produce a clear image, and far enough away to prevent flashover between the electrodes of the cartridge and the drum.

An example of cartridge construction is described in applicant's U.S. Pat. No. 4,679,060. This cartridge includes a number of relatively thin planar structural layers. An image is produced by a combination of electrodes at an inner surface of the cartridge, and outer surfaces facing away from the drum are provided with contacts for electrical connection of the electrodes with corresponding spring biased contacts linked to a cartridge control board, also known as a mother board, for controlling the image generation. A suitable configuration of printer for receiving such a cartridge is described in applicant's U.S. Pat. No. 4,516,847. The cartridge also includes an aluminum spine which rigidifies the cartridge and extends outwardly to provide a handle to be used when the cartridge is being fitted or removed from the printer.

The cartridge is mounted in a printer on mounting blocks which are adjusted relative to rigid parts of the print structure using shims to give the desired spacing between the cartridge and the drum surface (typically 0.01 inches). Understandably, it would be difficult to adjust this spacing each time a cartridge was replaced. Accordingly, the mounting blocks are set-up during assembly of the printer and are not normally adjusted during the life of the printer, so that replacement cartridges must be accurately located on the mounting blocks. To achieve this accurate location, the lower contact surface of each cartridge must be accurately sized and therefore formed of a high grade material, typically FR4 fibre glass reinforced epoxy, which adds considerably to the cost of the cartridge. There is also the problem of particles of dust or the like finding their way between contact surfaces of the cartridge and mounting and thus affecting the spacing.

Connections between the contacts on the outer face of the cartridge and the mother board are made by pogo stick type spring contact which depend from the mother board. These contacts are relatively expensive and the total cost of the 260 or so contacts required for a cartridge adds significantly to the total cost of the printer. Also, the spring forces exerted on the cartridge contacts further complicate the accurate location of the cartridge as the forces, though small, tend to push the cartridge towards the drum, and could affect the spacing between the cartridge and drum.

Other forms of cartridges are available which provide the cartridge contacts on the inner face of the cartridge and do not require such expensive spring contacts. However, the mother board contacts for such cartridges must be located in the restricted space between the cartridge and the drum, the space becoming more restricted as larger diameter print drums are utilized. These cartridges also suffer from the disadvantage that the spring forces from the mother board contacts tend to push the cartridge away from the drum, and again could affect the spacing between the cartridge and the drum.

In addition, the above described construction of a cartridge does not facilitate cooling of the cartridge which is desirable to minimize distortion of the cartridge and to minimize undesirable temperature effects which affect the operation of the cartridge.

SUMMARY OF THE INVENTION

It is an object of this invention to provide a cartridge mounting which does not require a large bearing surface of high grade material to ensure accurate location in a printer.

It is another object of the present invention to provide a cartridge mounting in which the spacing between the cartridge and drum surface is provided by spacers between the cartridge and the drum.

It is further object of the present invention to provide a cartridge mounting which provides contacts which act perpendicularly relative to the accurate spacing requirement between the cartridge and drum.

It is a yet further object of the present invention to provide a hollow cartridge which includes a passage for cooling air.

Accordingly, in one of its aspects the present invention provides a cartridge mounting for locating a cartridge in a printer adjacent a surface for receiving a charge image from the cartridge. The cartridge includes a rigid spine and has an inner face adjacent a portion of the image receiving surface. The mounting has provision for locating the cartridge relative to the image receiving surface and has spacers extending from the inner face of the support member and in sliding contact with the image receiving surface to space the cartridge a predetermined distance from the surface.

BRIEF DESCRIPTION OF THE DRAWINGS

The invention will be better understood with reference to the accompanying drawings, in which.

DESCRIPTION OF THE PREFERRED EMBODIMENTS

Figure 1:
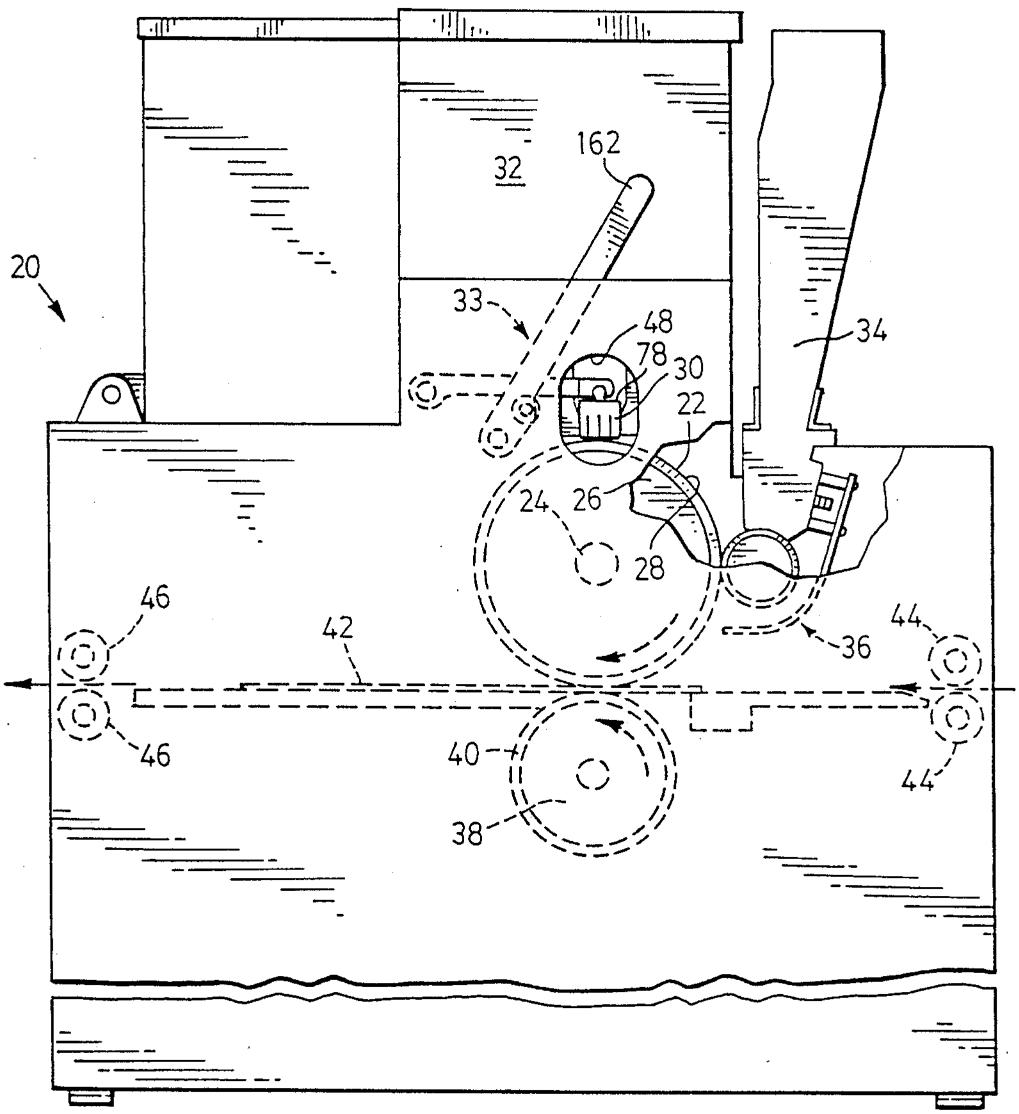
FIG. 1 is a side view of an exemplary printer containing a cartridge mounting according to a preferred embodiment of the present invention.

Reference is made first to FIG. 1 which is a somewhat schematic side view of an exemplary printer 20 incorporating a preferred embodiment of cartridge mounting 33 according to the present invention. The invention is particularly useful with this type of printer but could be used with other types of printers.

A print drum 22 is mounted for rotation about an axis 24 and has an electrically conductive core 26 with a dielectric layer 28 capable of receiving a charge image from a print cartridge 30 driven by an electrical control system 32 and held in place by the cartridge mounting 33 in accordance with the present invention. As the drum 22 rotates in the direction shown, a latent image is created by the cartridge 30 on the outer surface of the dielectric layer 28 and comes into contact with toner supplied from a hopper 34 by a feeder mechanism 36. The resulting toned image is carried by the drum 22 towards a nip formed between the drum 22 and a pressure roller 38 having a compliant outer layer 40 positioned in the path of a receptor such as a paper sheet 42 which enters between a pair of feed rollers 44. The pressure in the nip is sufficient to cause the toner to transfer to the paper sheet 42 and, because the axis of the drum 22 and roller 38 lie at an angle of 45 minutes to one another, the toner combination of pressure and shear cause the toner to be fused to the paper as it is transferred from the drum to the paper. The paper leaves between a pair of output rollers 46.

It is desirable that all operator functions and maintenance may be carried from one side of the printer and for this purpose an access opening 48 is provided in the side of the printer to permit access to the cartridge 30.

Figure 2:
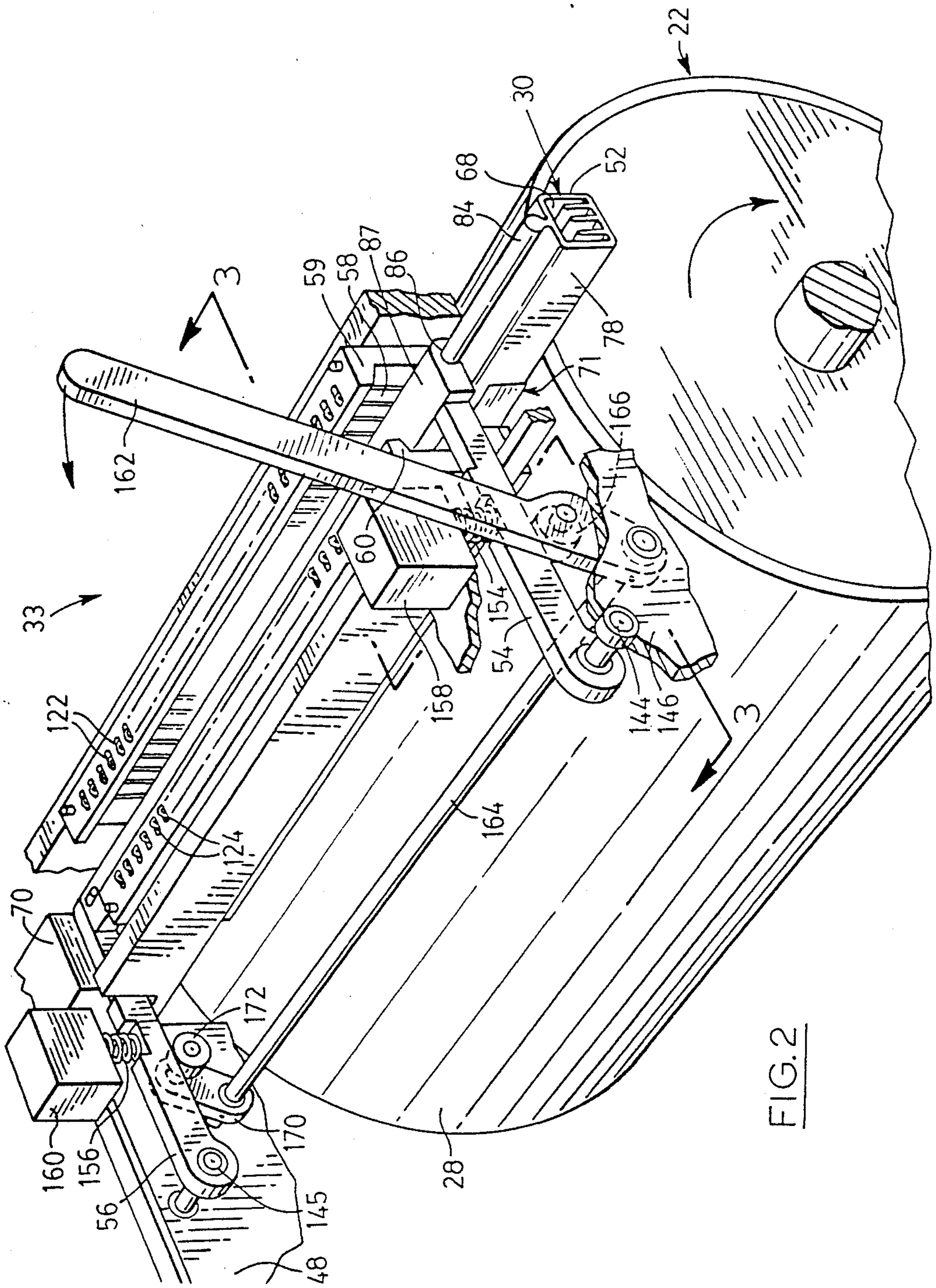
FIG. 2 is a perspective view from above of the cartridge mounting of FIG. 1 drawn to a larger scale including a cartridge and parts of the printer.
Figure 3:
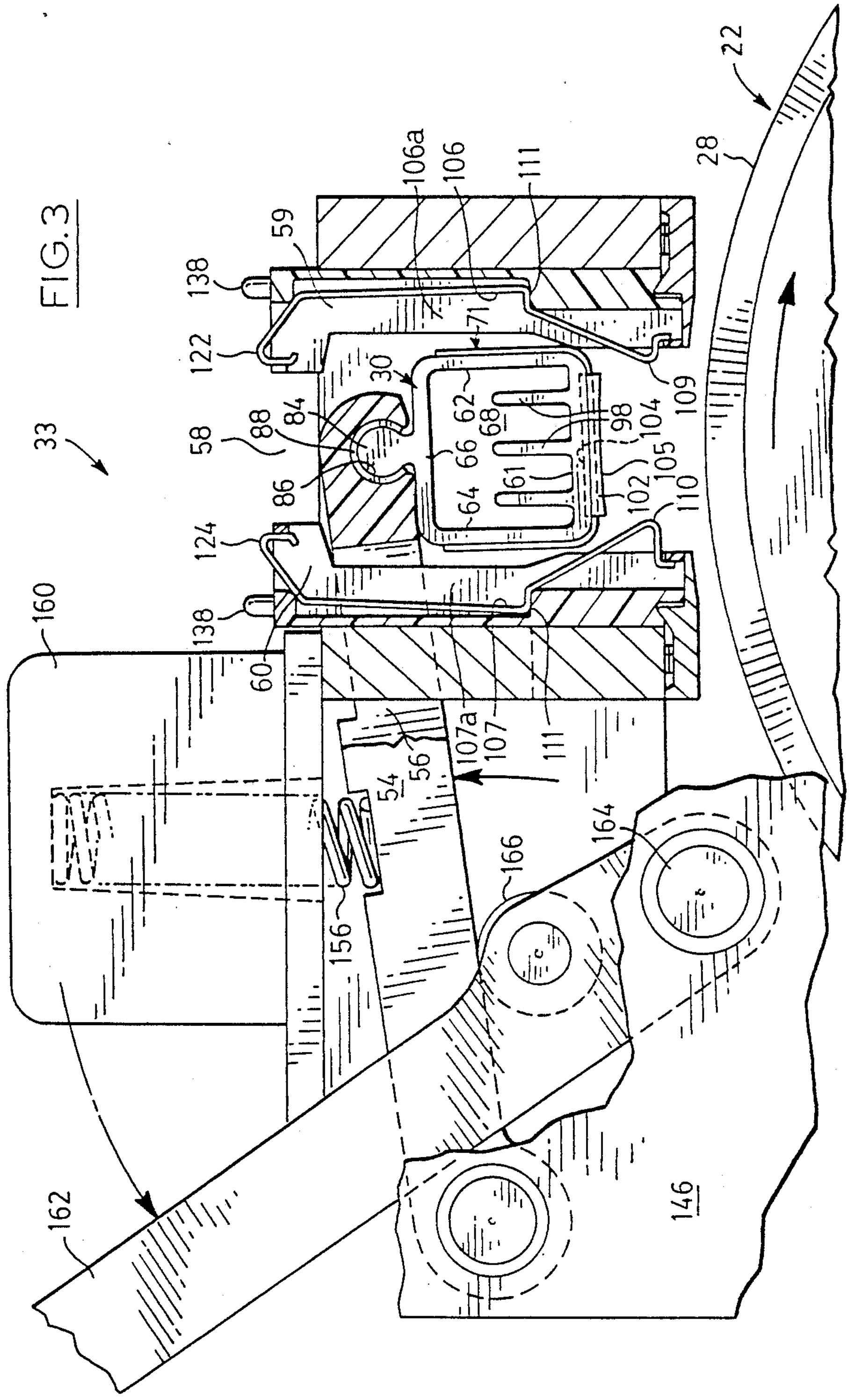
FIG. 3 is a side view on compound section line 3—3 of FIG. 2 and showing the cartridge mounting in an access configuration.

Reference is now made to FIG. 2 which is a perspective view from above of the cartridge mounting 33. This view shows the main parts of the mounting 33 including the cartridge 30 which features a hollow aluminum spine 52, first locating means, in the form of a pair of pivoting arms 54, 56, for locating the cartridge 30 radially relative to the drum, and second locating means, in the form of a channel 58 formed between leading and following elements 59, 60 mounted on the printer structure for locating the cartridge 30 tangentially in opposition to the drag caused by the movement of the drum. The cartridge 30 is removable from the printer 20 when the mounting 33 holds the cartridge 30 in an access position, as shown in FIG. 3. The mounting 33 is operable manually to move the cartridge 30 into an operative position, as shown in FIGS. 2 and 4.

Before, describing the operation of the mounting 33 in detail, the parts of the cartridge 30 will be described with particular reference to FIGS. 4, 5 and 6. For the purposes of this description the parts of the cartridge 30 and mounting 33 are described below with reference to the relative location of the print drum. Accordingly, parts and surfaces adjacent or generally opposing the drum are referred to as "inner", parts and surfaces spaced from or generally facing away from the drum 22 will be referred to as "outer", parts and surfaces located or facing generally in the direction of rotation of the drum will be referred to as "leading", and parts or surfaces located or generally facing oppositely to the direction of rotation of the drum 22 will be referred to as "following". Also directions parallel to the axis of the drum are referred to as "axial".

Figure 4:
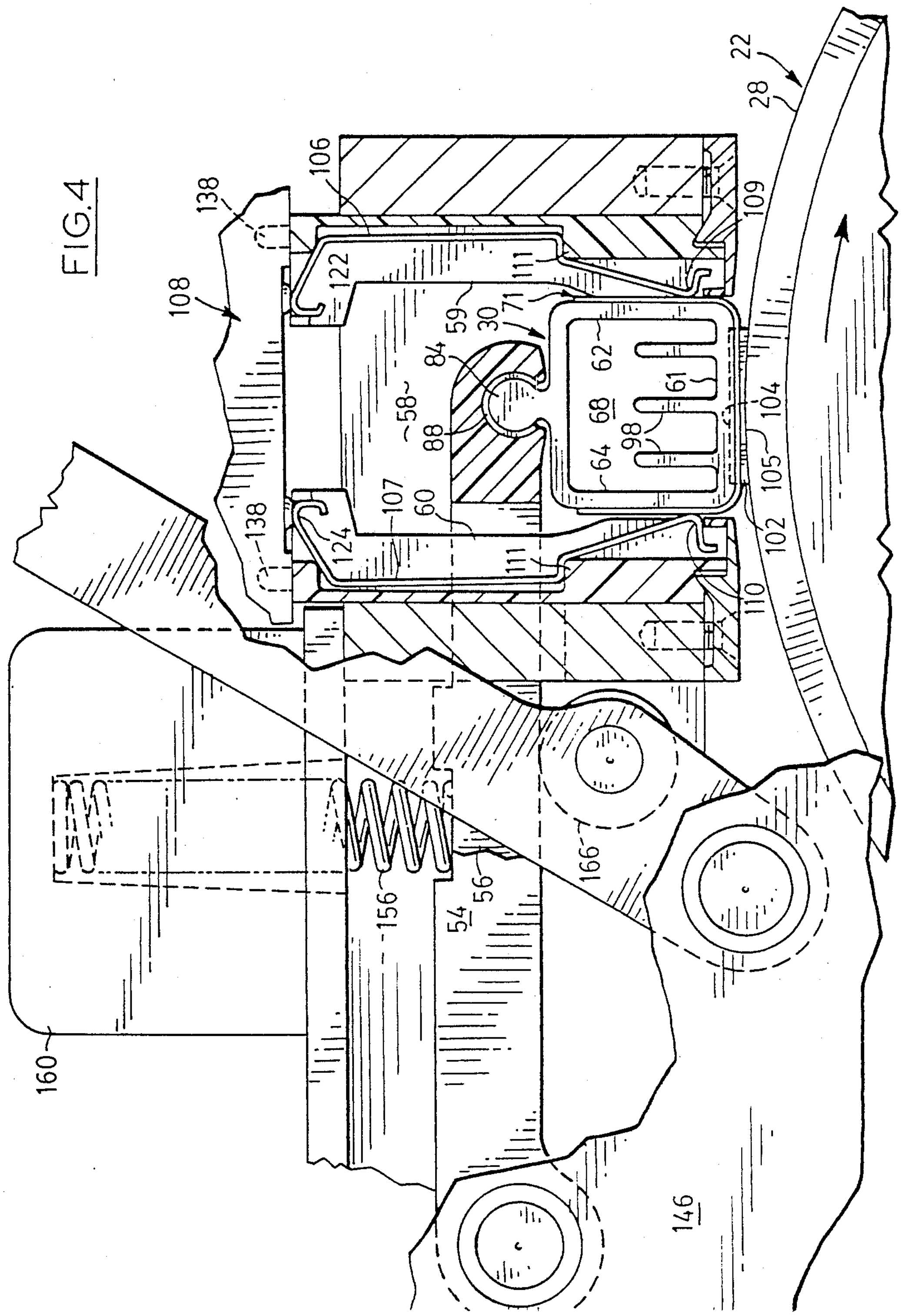
FIG. 4 is a similar view to FIG. 3, but showing the cartridge mounting in an operative configuration.
Figure 5:
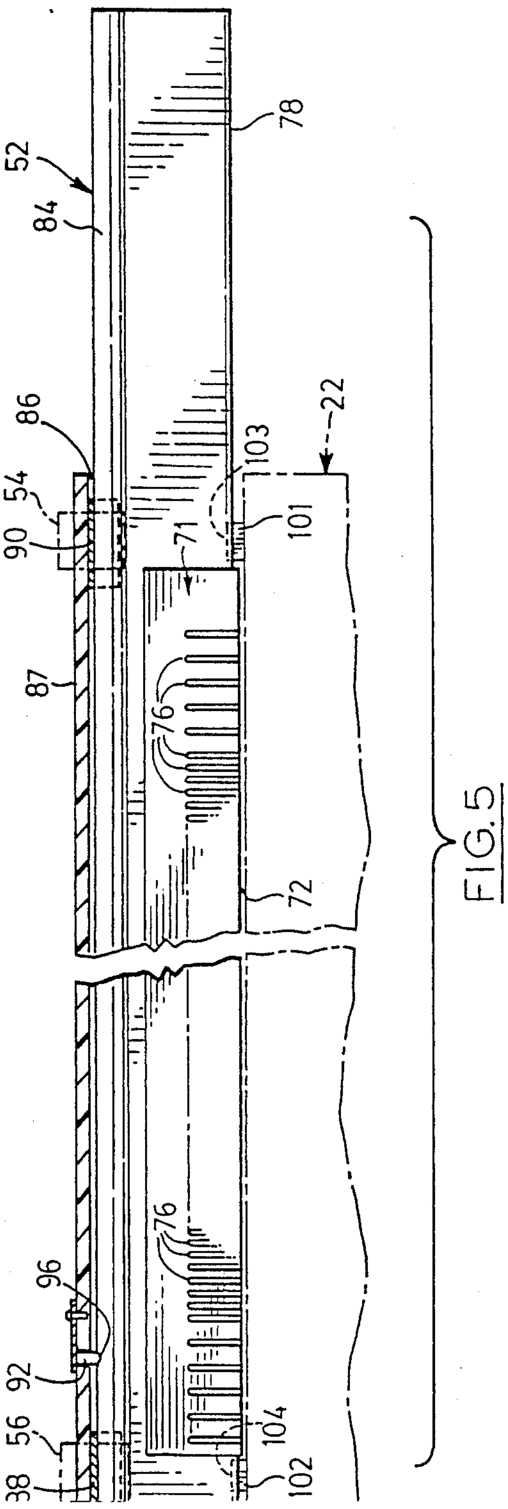
FIG. 5 is a side view of the cartridge and including a portion of the structure in section and a portion of the drum shown in ghost outline.
Figure 6:
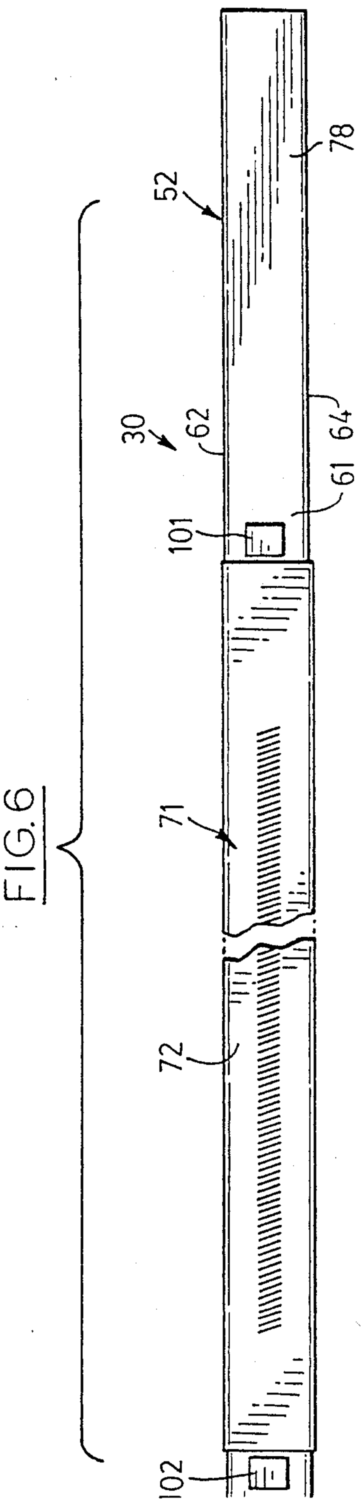
FIG. 6 is a view from below of the cartridge of FIG. 5.

As seen with reference to FIGS. 4, 5 and 6, the cartridge 30 is generally rectangular in cross-section and includes an inner wall 61, a leading side wall 62, a trailing side wall 64, and an outer wall 66, which collectively define a longitudinal pathway 68 for cooling air supplied from a clean source through an outlet fitting 70 (FIG. 2).

A U-shaped laminated structure, designated generally by the numeral 71, extends most of the length of the inner and side walls. A discharge portion 72 of the cartridge is located on the external face of the inner wall 61 and contacts 76 (FIG. 5) for the electrodes in the discharge portion 72 extend up the structure 71 on the side walls 62, 64.

The cartridge 30 operates in a similar manner to those described in U.S. Pat. Nos. 4,155,093 or 4,160,257. A portion of the cartridge 30 extends axially from the mounting 33 to form a handle 78 which is accessible from the access hole 48 (FIG. 1).

The external surface of the outer wall 66 is provided with a locating rib 84 in the form of a necked elongate bead to be slidably received by a complementary channel 86 formed in a member 87 which extends between the ends of the pivoting arms 54, 56. As can be more clearly seen in FIG. 4, the rib 84 and channel 86 are of part circular section, permitting a degree of pivoting between the cartridge 30 and the arms 54, 56. Bushings 88, 90 (see FIG. 5 particularly) are provided in the channel 86 to locate the rib 84, and a spring detent 92 (FIG. 5) is provided in the member 87 to engage a small notch 96 in the outer edge of the rib 84 to positively locate the cartridge 30 axially relative to the member 87.

Referring once more to FIG. 4, three cooling fins 98 extend outwardly from the inner wall 61 to facilitate heat dissipation from the discharge portion 72 and the inner wall 61 of the cartridge to the cooling air flowing through the pathway 68. This serves to minimize distortion of the spine 52 and to mitigate heat effects which affect the performance of discharge portion 72 of the cartridge.

As seen in FIGS. 4 and 6, spacing between the cartridge and the print drum is achieved by spacers 101, 102 located at the ends of the cartridge. The spacers 101, 102 are fixed in recesses 103, 104 (FIG. 5) provided on the external face of the inner wall 61. In the operative position, the spacers are in sliding contact with the drum surface and have an arcuate contact surface corresponding to the curvature of the drum surface. To minimize bending forces on the cartridge 30 from the forces exerted by the arms 54, 56 through the member 87, the spacers are aligned with the bushings 88, 90 such that the forces exterted by the ends of the arms are aligned with the spacers. The spacers may be made from any suitable material such as high density polyethelene though a material having particularly suitable properties is a modified tetrafluoroethane sold under the trade mark DURCITE by Shamban Canada Inc..

As described above, the contacts 76 (FIG. 5) for the cartridge electrodes extend up the structure 71 on the wide walls 62, 64. As can be seen in FIG. 4, respective leading and following spring contacts 106, 107 reside in from slots 106*a*, 107*a* in the elements 59, 60 which form the channel 58 to bear against the cartridge contacts 76 and connect them to the cartridge controlling mother board 108. Typically 240 contacts are provided but this may vary with the width of the cartridge.

The spring contacts 106, 107 are preferably formed of circular cross-section wire and extend for the height of the channel 58 Ledges, 111 are provided in the channel 58 to support elbows in the contacts 106, 107 radially relative to the drum 22. As better seen in FIG. 3, the springs 106, 107 sit in the slots 106*a*, 107*a* and have respective inner portions 109, 110 biased to extend through toward one another at inner portions of the channel 58. Outer portions 122, 124 of the springs 106, 107 extend outwardly for electrical connection with corresponding contacts provided on the mother board 108 which is positively located in the relation to the mounting 33 by means of locating pins 138 (see also FIG. 2) provided on the outer face of the channel. The engagement of the mother board is resisted by engagement with ledges 111 to ensure good electrical contact, and apart from the ledges 111, the contacts 106, 107 are held in place by bars extending across the slots 106*a*, 107*a*. As seen in FIG. 3, respective inner bars 106*b*, 107*b* bridge the slots 106, 107 to trap end pieces 109*a* and 110*a* of the contacts. At the other ends, the contacts have nose portions 122*a*, 124*a* which are in engagement with outer bars 106*c*, 107*c* and these, together with nose portions 106*d* and 107*d* in engagement with inner extremities of portions 122, 124, prevent loss of the contacts from the slots. Also, during use, these parts help to locate and to some extent control the bending of the contacts.

On movement of the spine and cartridge to the access position as shown in FIG. 3, the inner portions 109, 110 of the spring contacts assume their uncompressed state and extend into the channel 58. It is also noticeable from FIG. 3 that the inner portion 110 of the following spring contact 107 extends further into the channel than the inner portion 109 of the leading spring contact 106. This results in the following contact 107 being deformed to a greater extent and therefore exerting a greater force on the cartridge in the operative position to cause the cartridge to locate against element 59 as can be seen from FIG. 4.

FIG. 3 also shows the location of the outer portions 122, 124 of the spring contacts 106, 107 when the mother board 108 has been removed. The use of this form of spring contact allows electrical connections to be made between the mother board and the cartridge without the need to perform any soldering operations and at the same time the cartridge is biased into engagement with the locating element 59.

Movement of the cartridge 30 and mounting 33 between the operative and access positions is achieved by means of the pivoting arms 54, 56, the operation of which is described below with reference to FIG. 2. As was mentioned above, the leading ends of the arms 54, 56 are joined to an elongate member 87 which defines the channel 86 for receiving the rib 84 of the cartridge 30. One arm 56 is pivotally joined to the member 87 to allow an additional degree of freedom, for compliance with practical straightness tolerances. From the member 87, the arms 54, 56 extend perpendicularly to pivotal connections with respective pivot pins 144, 145 which extend from parts of the printer structure 146, 148. Intermediate the member 87 and the pivot locations, the arms are fixed by compression springs 154, 156 which extend from mounting boxes 158, 160 on the printer structure to bias the arms 54, 56 and cartridge 30 into the operative position.

Movement of the arms 54, 56 between the operative and access positions is achieved by the use of a pivoted handle 162, the free end of which extends from the side of the printer to be accessible to an operator (FIG. 1). The handle 162 is fixed to a shaft 164 which is pivotally mounted to the printer structure 146, 148 below the arms 54, 56. A lift roller 166 is rotatably mounted on a stub shaft that extends perpendicularly from the handle and engages the inner surface of the arm 54. A complementary stub shaft extends from a link 170 which is fixed to the opposite end of the shaft 164 and a complimentary lift roller 172 is provided on the shaft for engaging the stub inner surface of the arm 56. Rotation of the handle 162 away from the drum 22 causes the rollers 166, 172 to lift the arms 54, 56 and thus lift the spine and cartridge from the operative to the access position. On rotation of the handle 162 in the opposite direction the compression springs 154, 156 bias the arms 54, 56 towards the operative position. The cartridge 30 is retained in the operative position by the action of the springs 154, 156 on the arms 54, 56, and in the access position by the action of the springs 154, 156 and the over centre location of the lift rollers 166, 172. However, if additional security is required means may be provided for securing the handle in the operational or access position.

The steps necessary for replacement of a cartridge will now be described with reference to the above description. After switching the printer off, the operator rotates the handle 162 in a counter clockwise direction (as seen in FIG. 1). This lifts the arms 54, 56 and cartridge 30 from the operative position (FIG. 4) to the access position (FIG. 3). On lifting, the cartridge 30 is moved into a wider outer portion of the channel 58 and the cartridge contacts 76 are disconnected from the spring contacts 106, 107. If the operator then grips the handle 78 and pulls the cartridge, the detent 92 is disengaged and the rib 84 slides in the channel 86 to permit axial removal.

To insert a new cartridge 30 the same sequence of steps is carried out in reverse. The rib 84 is slid into the channel 86, the bushings 88, 90 having a taper to facilitate entry, until the detent 92 engages the notch 96. The handle 162 is then rotated in the clockwise direction to move the cartridge 30 into the operative position.

The cartridge 30 is moved inwardly until the spacers 101, 102 contact the drum surface 28, in which position the spacing between the cartridge and the drum is correct. The printer may then be switched on and used.

From the above description, it may be seen that the spacer feature facilitates accurate location of a cartridge within a printer and removes the need for larger areas of accurately finished contact surfaces between the cartridge and its locating surfaces. The mounting also allows relatively inexpensive spring contacts to be used on printers with large diameter print drums, the spring forces acting orthogonally relative to the spacing between the cartridge and drum so as not to disturb the spacing. The hollow section of the cartridge also facilitates cooling.

It should be stressed that the above description is by way of example only and is not to be considered as limiting the scope of the present invention. Those skilled in the art will realize that the present invention may be put into effect by use of modified configurations and materials within the scope of the invention.

We claim:

1. A printer comprising:

a drum mounted for rotation in one direction about an axis and having an imaging area for receiving the pattern of electrostatic charge;

a toner system positioned adjacent the drum for toning the pattern;

transfer means for passing the toned pattern to another medium;

a cartridge for creating the pattern on the drum, the cartridge having a rigid spine, a planar face spaced by a predetermined gap from the drum with the cartridge in an operative position, spacer means coupled to the cartridge for engagement with the drum outside the imaging area, and first and second side faces including first contacts for connecting the cartridge electrically; and a cartridge mounting including second contacts for electrical engagement with corresponding ones of said first contacts with the cartridge in the operative position, and operable to move the cartridge between said operative position and an access position where the cartridge has been moved away from the drum a selected distance sufficient to clear the second contacts, the cartridge mounting and the cartridge defining location means for slidably moving the cartridge into engagement with the mounting along a path substantially parallel with said axis and into the access position, and for holding the cartridge as it is moved between the operative and access positions, the cartridge mounting further including a location face engageable by the cartridge first face as the cartridge tends in use to be moved with the drum to thereby locate the cartridge accurately, and resilient biasing means for applying a load on the cartridge in the operative position to retain the cartridge spacer means in sliding contact with the drum.

2. A cartridge mounting as claimed in claim 1, in which the spacer means is in the form of a plurality of spacer blocks spaced along the length of the cartridge.

3. A cartridge mounting as claimed in claim 2, in which two spacer blocks are provided, one adjacent each end of the cartridge.

4. A cartridge mounting as claimed in claim 2, in which the inner face of the cartridge is provided with recesses for receiving the spacer blocks.

5. A cartridge as claimed in claim 2, in which the spacer blocks are of modified tetrafluoroethane.

6. A printer as claimed in claim 1, in which the second contacts are in two groups, the first group normally projecting from said location face and the second group positioned for engagement with said first contacts on said first face.

7. A printer as claimed in claim 6, in which the contacts in the second group bias the cartridge into engagement with said location face.

8. A printer as claimed in claim 1, in which the cartridge mounting includes arm members attached at one end to said location means and pivoted at the other end such that angular movement of the arm members moves the cartridge between the operative and access positions.

9. A printer as claimed in claim 1, in which the location means includes a longitudinal location rib and a complementary receiving channel.

10. A printer comprising:

a print surface movable in one direction for receiving a charge image;

drive means operable to move the print surface in said direction;

a cartridge including a rigid spine, an inner face for location adjacent and spaced from the print surface and a side face extending substantially orthogonally from the inner face and having a discharge portion at the inner face and contacts at the side face;

locating means positioning the cartridge relative to the print surface and biasing the cartridge towards the print surface and maintaining a predetermined spacing between said inner face and the print surface;

stop means positioned to prevent movement of the cartridge in said direction;

spring biased contact means for electrical connection with the cartridge contacts, the spring force from the contact means being exerted substantially orthogonally to the cartridge side face such that the spring force acts substantially orthogonally to the biasing force from the cartridge locating means and biases the cartridge against the stop means to locate the cartridge in said direction;

toner means positioned to apply toner to said charge image; and transfer means receiving the toned image and transferring the toned image to an image receptor.

* * * * *